J. G. JONES.
Can-Soldering Machine.
No. 221,570. Patented Nov. 11, 1879.
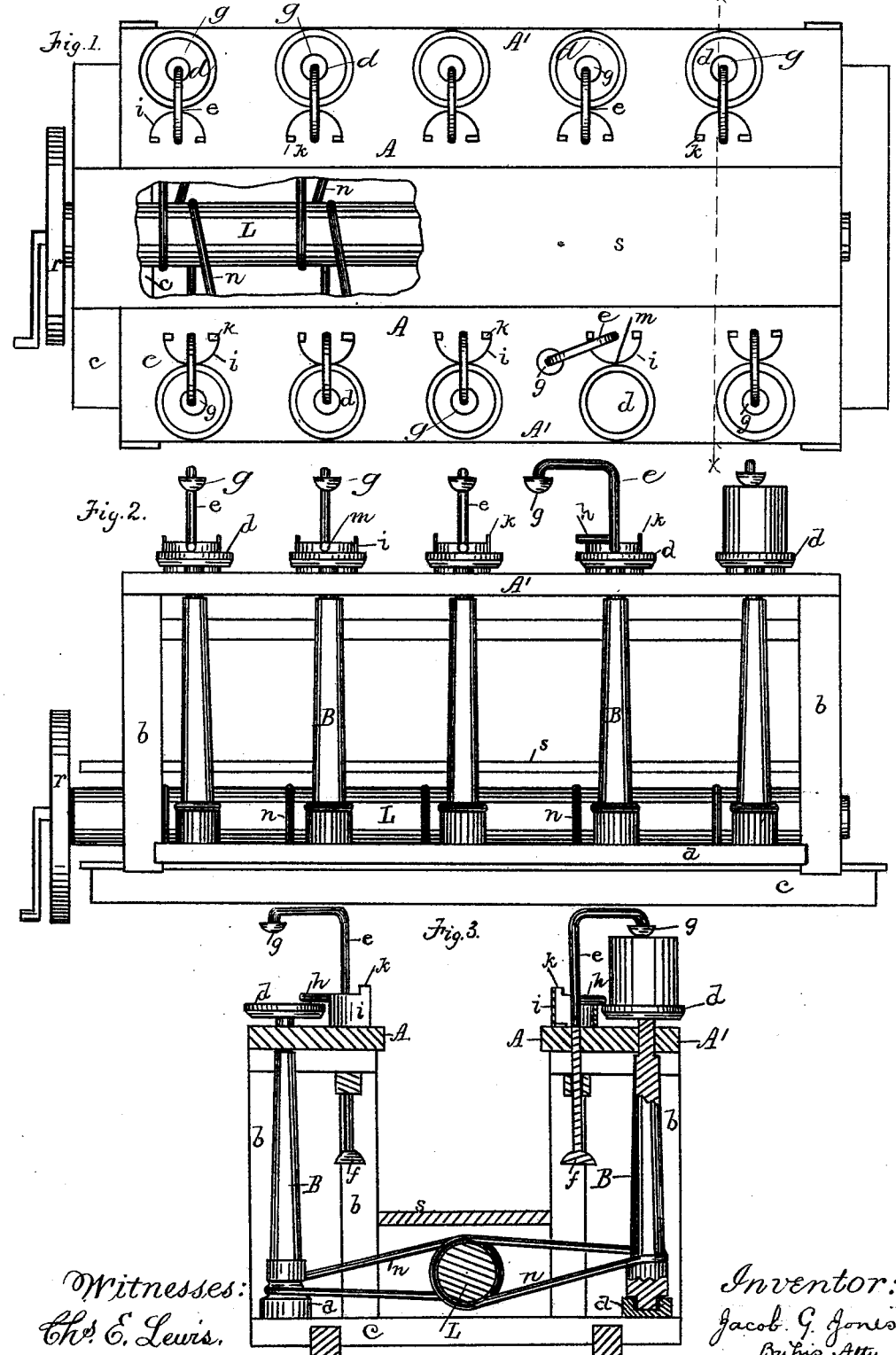
Witnesses:
Chs. E. Lewis.
A. C. Eader.
Inventor:
Jacob G. Jones
By his Atty
Chas. B. Mann

UNITED STATES PATENT OFFICE.

JACOB G. JONES, OF BALTIMORE, MARYLAND, ASSIGNOR OF ONE-HALF OF HIS RIGHT TO HORACE K. THURBER, OF NEW YORK, N. Y.

IMPROVEMENT IN CAN-SOLDERING MACHINES.

Specification forming part of Letters Patent No. 221,570, dated November 11, 1879; application filed April 17, 1879.

*To all whom it may concern:*

Be it known that I, JACOB G. JONES, of the city of Baltimore and State of Maryland, have invented a new and useful Improvement in Machines for Soldering Fruit and Oyster Cans, of which the following is a specification.

My invention relates to an improvement in machines for facilitating the soldering of the heads of fruit and oyster cans, and also the soldering of caps on the cans after the same have been filled.

The object of the invention is to provide an apparatus that shall have a number of disks or independent seats, each of which shall be adapted to be revolved by power and support a can resting on its end, and which shall be provided with devices to retain the head or cap in position while the soldering-iron is being applied, and which shall be so constructed that the operator who handles the soldering-iron may not be hindered by the attendants who place the cans on and remove them from the machine.

In the accompanying drawings, Figure 1 is a plan view. Fig. 2 is a side view. Fig. 3 is a cross-section through $x\,x$.

The letter A represents the stand, of which, in the present instance, there are two. These stands are of sufficient width to afford room for a tray containing cans to be placed thereon, and are supported by posts or standards $b$, which rest on a frame, $c$, placed on the floor. A number of vertical shafts, B, placed at suitable distances apart, have their spindles resting in bearings $a$, secured to the frame $c$, the upper bearing of the shafts being in the outer rail, A'. Each shaft has secured on its upper extremity a disk, $d$, which serves as a seat upon which to place a can while its cap is being soldered, or while the head is being soldered.

$e$ is an iron rod passing vertically through the stand, and to the lower end of which, below the stand, a weight, $f$, is attached. Toward the upper end this rod is bent at a right angle to its vertical portion, and is provided at the end with a knob, $g$, made of porcelain or some vitreous material, which rests upon the cap during the operation of soldering, and serves, by means of the weight, to hold the cap down.

The knob may be made of any other material than that named; but it is desirable that it be something to which the solder will not adhere.

An arm, $h$, projects from the rod in line with the bent upper end, and rests on a semicircular guideway, $i$, placed edgewise on the stand. The upper edge is provided with two stops, $k$, and midway between these is a notch, $m$, in which the arm $h$ rests when the knob is on the cap. The rod $e$ is adapted to be turned by the hand to the right or left until the arm $h$ comes in contact with the stop $k$, and has a vertical sliding movement to permit the arm $h$ to drop in the notch or be raised out of it.

A horizontal shaft, L, has its bearings in the frame $c$, and is placed midway between the two series of vertical shafts, with which it is connected by belts or cords $n$, of any suitable kind. This shaft L is of uniform size and of length sufficient to connect with the entire series of vertical shafts. It is driven by power applied to the pulley $r$, and is covered by a platform, $s$, onto which pass the attendants, who may be children, to place the cans on the disks and remove them when soldered, while the operator with the soldering-iron takes position on the outside.

It will be seen that when the can is on the disk or seat, and the cap is held down by the knob pressing on it, and the machine is in motion, the can is caused to rotate, and the cap may be instantly soldered by the application of an iron at one point.

The rods having the knob for holding down the cap or the head, as the case may be, are entirely out of the way of the operator, and are no impediment whatever.

In the present instance there are five shafts and cam-seats in each stand, though a greater or less number may be employed. Instead of two stands, as shown, and two series of shafts with can-seats, there may be but one.

The shaft L, having a uniform size, constitutes a continuous pulley, adapted to receive at any point the belts or cords which drive the vertical shafts, and is much cheaper than a shaft provided with a number of pulleys, and, unlike the latter, does not require any adjustment to suit the belts or cords. The location also of the horizontal shaft permits of the platform being placed over it, rendering both sides of the machine accessible for the attendants, and all the operative parts are out of the way.

Having described my invention, I claim and desire to secure by United States Letters Patent—

1. In combination with a can seat or disk, a rod adapted to have a partial rotary and a vertical sliding movement, as described, and having one end adapted to rest on the can cap or head, and the other provided with a weight and having a projecting arm, and a guideway for the arm having stops and a notch, as set forth.

2. In a can-capping machine, the combination of a vertical movable weighted rod having one end provided with a knob of porcelain or vitreous material to rest on the can-cap, a horizontally-projecting arm attached rigidly to the rod, and a semicircular guideway for the arm having stops, as set forth.

3. In a can-soldering machine, the combination of the horizontal shaft L, having bearings in frame c, platform s, placed over the shaft, a series of vertical shafts, B, each provided with a can seat or disk, d, and a rod passing vertically through the stand and weighted, and having its upper end bent to rest on the can cap or head, as set forth.

JACOB G. JONES.

Witnesses:
CHARLES E. LEWIS,
CHAS. B. MANN.